Dec. 13, 1955     E. H. TAYLOR     2,726,438
METHOD OF PRESSURE WELDING
Filed May 15, 1952     3 Sheets-Sheet 1

INVENTOR.
Edward Hall Taylor,
BY
Brown, Jackson, Boettcher & Dienner,
Atty's.

Dec. 13, 1955    E. H. TAYLOR    2,726,438
METHOD OF PRESSURE WELDING
Filed May 15, 1952    3 Sheets-Sheet 2
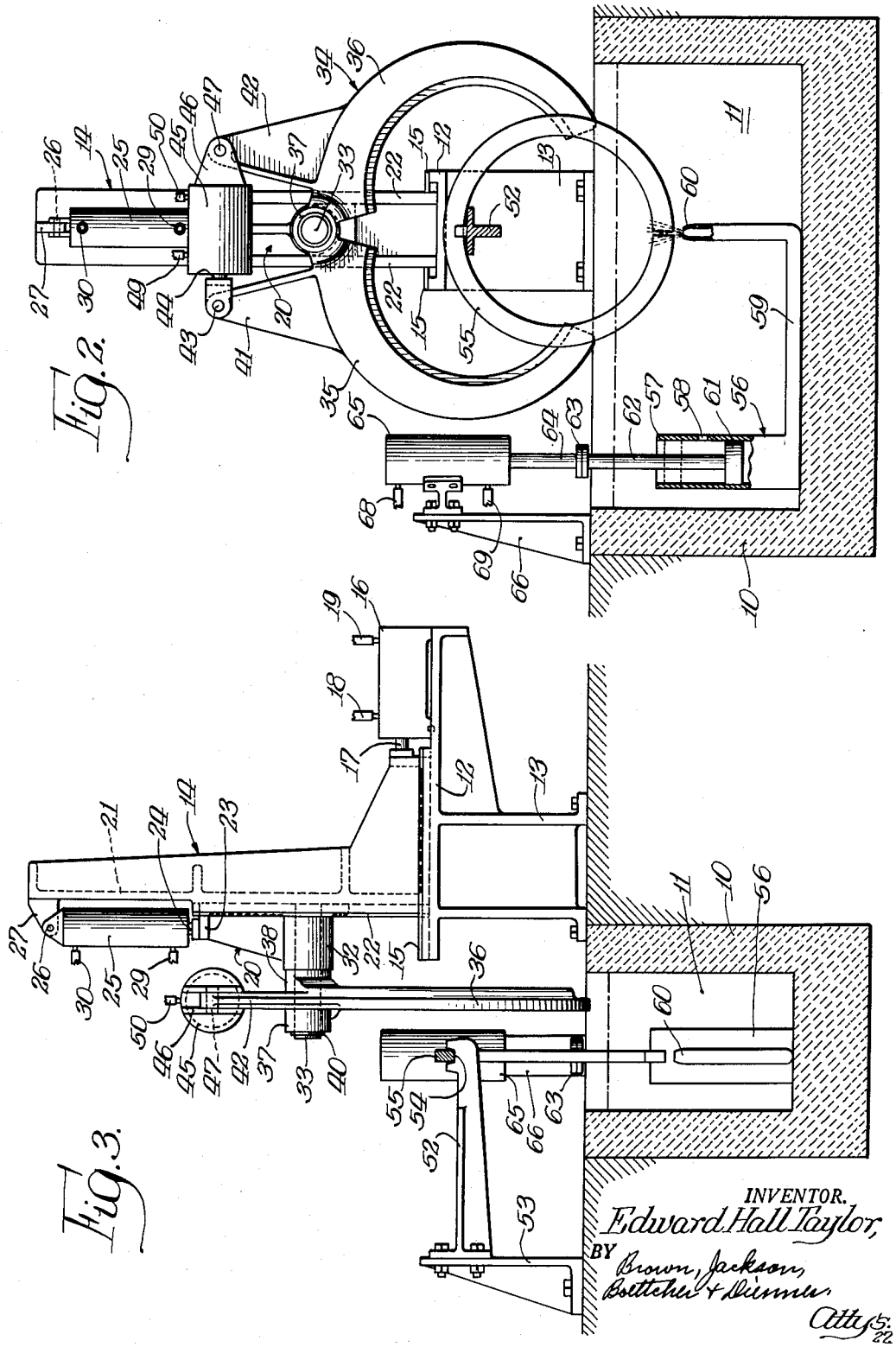
INVENTOR.
Edward Hall Taylor,
BY Brown, Jackson,
Boettcher + Dienner
Attys.

Dec. 13, 1955   E. H. TAYLOR   2,726,438
METHOD OF PRESSURE WELDING
Filed May 15, 1952   3 Sheets-Sheet 3
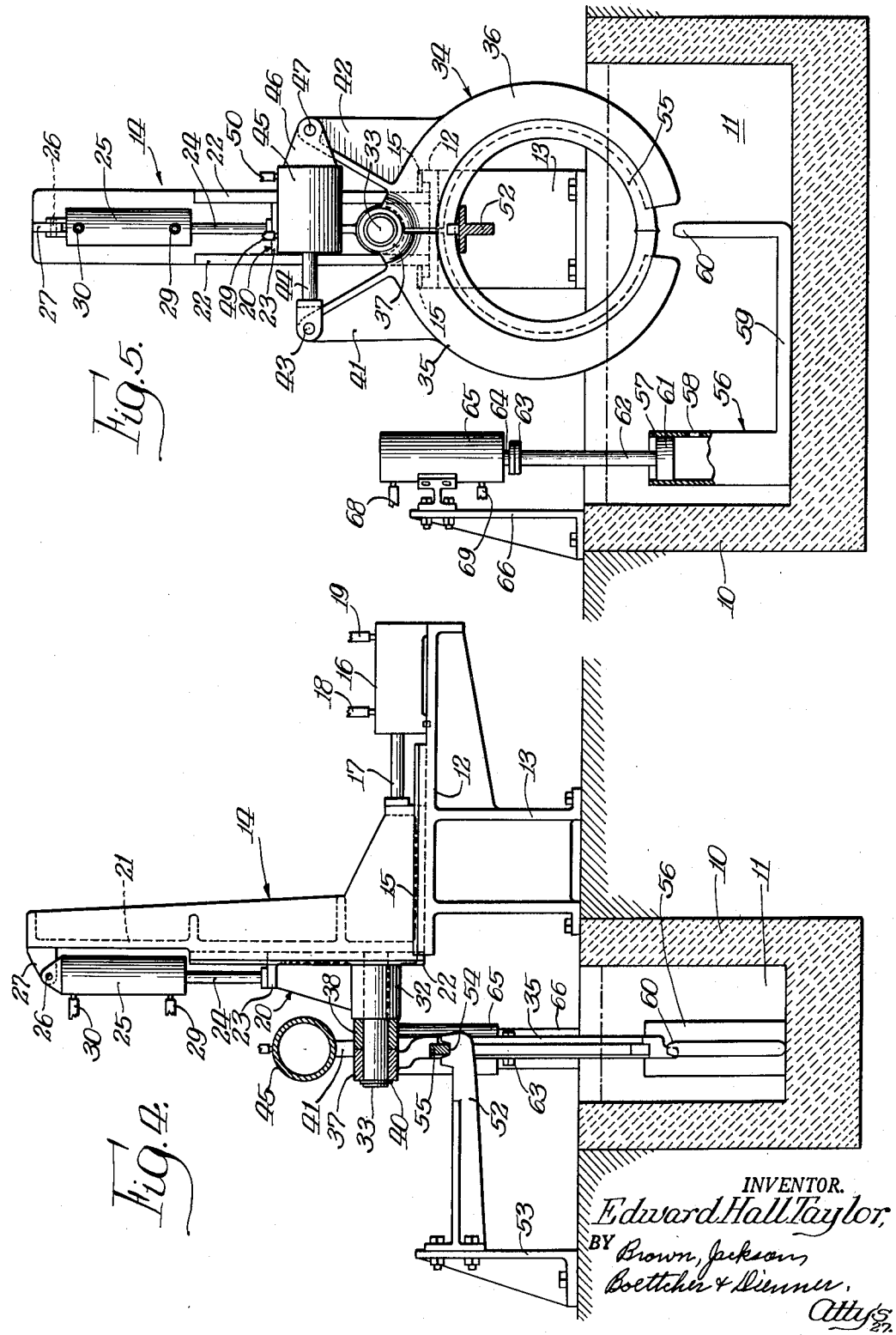
INVENTOR.
Edward Hall Taylor,
BY Brown, Jackson,
Boettcher & Dienner.
Atty's United States Patent Office 2,726,438
Patented Dec. 13, 1955

2,726,438

METHOD OF PRESSURE WELDING

Edward Hall Taylor, Winnetka, Ill., assignor to Taylor Forge & Pipe Works, Cicero, Ill., a corporation of Illinois Application May 15, 1952, Serial No. 287,852

3 Claims. (Cl. 29—488)

This invention relates to welding and has to do with a method of joining metal parts by pressure welding.

In pressure welding, as presently practiced, the parts to be joined are commonly heated to welding temperature and, while at welding temperature, are forced together under welding pressure, while being exposed to the air. Under the present conditions referred to, the surfaces to be joined become coated with scale or oxide which renders it difficult to obtain a clean and mechanically strong weld free of defects.

The method of my invention is directed to avoiding the above noted objections to the present practice. To that end, I heat the parts to be joined to welding temperature in an inert bath and, while immersed in the bath and at welding temperature, force the parts together under welding pressure. More particularly, I immerse the parts to be joined in an inert liquid bath heated to an appropriately high temperature effective for quickly raising the parts to welding temperature, the surfaces to be joined being cleaned so as to remove all scale and foreign material therefrom and provide clean metal surfaces, and then force the cleaned surfaces together while at welding temperature and under welding pressure and while they remain immersed in the inert bath. The surfaces to be joined preferably are cleaned while the parts are immersed in the bath, but under favorable conditions they may be cleaned prior to immersion and heating of the parts in the bath, and then immersed in the bath before oxides form to any objectionable extent on the cleaned surfaces. In that manner, I avoid the presence of foreign substances on the surfaces to be joined and assure a clean and mechanically strong weld free of defects caused by the presence of foreign substances. Further objects and advantages of my invention will appear from the detail description.

In the drawings:

Figure 2 is a sectional view taken substantially on line 2—2 of Figure 1, certain parts being shown in elevation and certain other parts being partly broken away and shown in section;

Figure 3 is a sectional view taken substantially on line 3—3 of Figure 1, certain parts being shown in elevation;

Figure 4 is a sectional view similar to Figure 3 but with the clamp in lowered position and closed about the ring; and Figure 5 is a view similar to Figure 2 but with the clamp closed about the ring to a greater extent than in Figure 4 effective for forcing the ends of the ring together under welding pressure.

Figure 1:
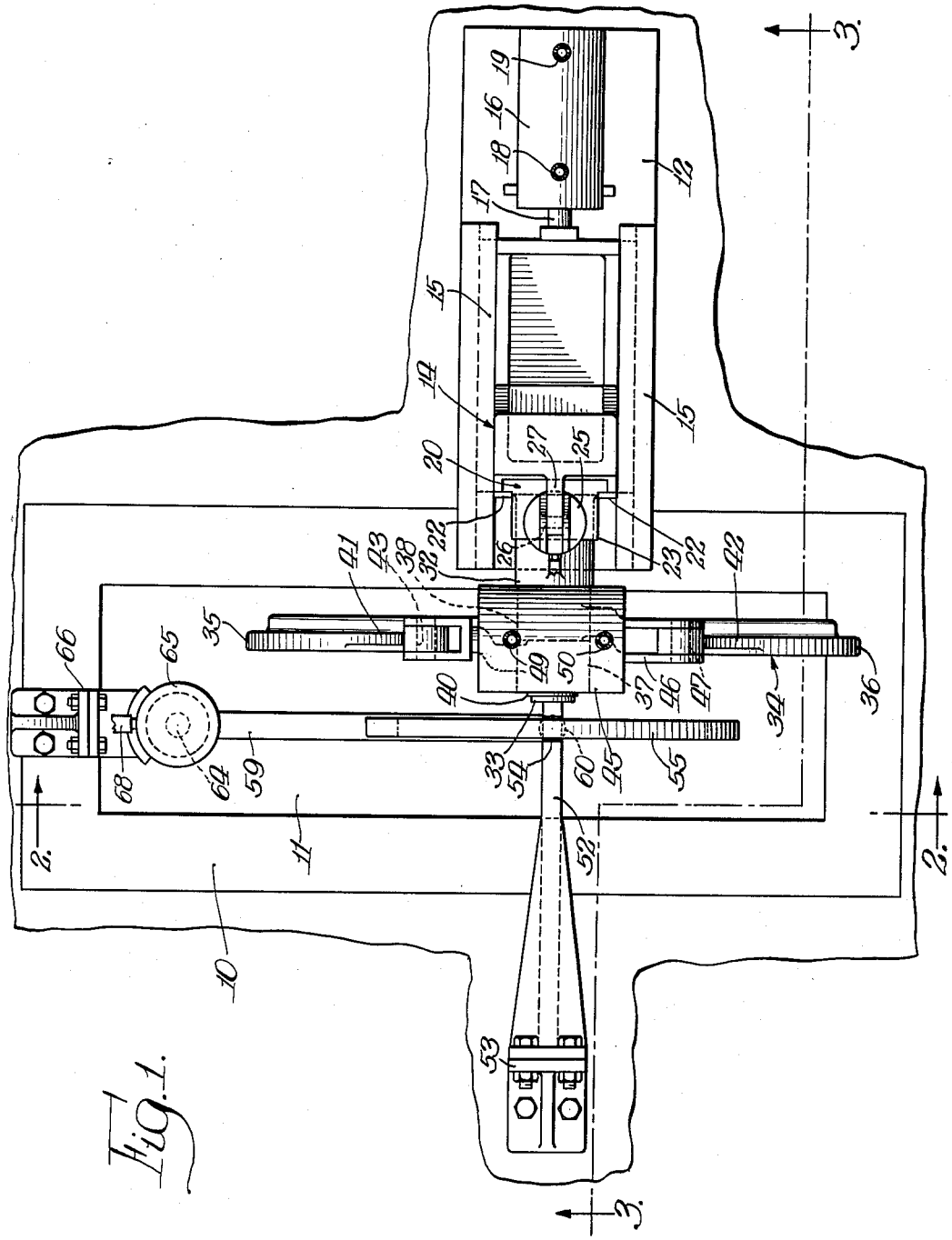
Figure 1 is a plan view of an apparatus suitable for practicing the method of my invention.

The apparatus shown in the drawings is by way of example only and any suitable apparatus may be employed for practicing the method of my invention. Referring to the drawings, the apparatus comprises a refractory tank or pot 10 such as that used in known metal treating electrode furnaces. The pot 10 contains a bath 11 of a suitable salt, which is heated to appropriate temperature by electrodes (not shown) as is known. Any suitable salt may be employed for the bath, though ordinarily I prefer to employ barium chloride as the bath. The salt is in molten condition and provides a liquid bath which may have a temperature as high as 2350° F., and preferably is maintained at approximately the level indicated.

A table 12 is mounted adjacent one side of the pot 10, on a suitable stand or base 13. A carriage 14, of approximately L shape in vertical section, is slidably mounted on the upper face of table 12, between guides 15. A cylinder 16 is fixed on table 12 in rear of carriage 14 and slidably receives, through its forward end, a piston rod 17 fixed to the lower horizontal arm of carriage 14. A piston (not shown) is fixed to the other or rearward end of piston rod 17 and operates in the cylinder 16. Two conduits 18 and 19 are connected to the cylinder 16 adjacent the inner and the outer ends, respectively thereof. Suitable means is provided for supplying operating fluid under appropriate pressure to the cylinder 16 through either of the conduits 18 or 19, selectively, and exhausting fluid from the cylinder through the other conduit. As will be understood from what has been said, the cylinder 16 and the piston rod 17 provide means for moving the carriage 14 in either direction and to desired extent, within limits, transversely of the table 12.

A mounting plate 20 is slidably mounted on the front face of vertical arm 21 of carriage 14, between vertical guides 22. Plate 20 is provided at its upper end with a flange 23 to which is secured the lower end of a piston rod 24 slidable through the lower head of a cylinder 25 pivoted at its upper end at 26, to a bracket 27 secured to the upper end of arm 21. The upper end of piston rod 24 is secured to a piston (not shown) operating in the cylinder 25 and suitable conduits 29 and 30 are connected to cylinder 25 at the lower and the upper ends thereof, respectively. Suitable known means is provided whereby operating fluid under appropriate pressure may be admitted to the cylinder 25 through either of the conduits 29 or 30 and exhausted from cylinder 25 through the other conduit. That provides means whereby the mounting plate 20 may be adjusted vertically on arm 21 of carriage 14 in either direction and to any extent desired, within limits.

The plate 20 is provided, adjacent the lower end thereof, with a forwardly extending sleeve 32. A stub shaft 33 is secured in sleeve 32 and extends forwardly therefrom. A clamp 34 is mounted on the forward portion of stub shaft 33. This clamp 34 comprises two arcuate jaws 35 and 36 of angle cross section disposed in a common plane and provided with collars 37 and 38, respectively, mounted for turning movement on the stub shaft 33 and confined between sleeve 32 and a lock member 40 engaging in a circumferential groove in stub shaft 33 adjacent the forward end thereof. The clamp jaws 35 and 36 are provided, adjacent their upper ends, with upwardly extending arms 41 and 42, respectively, fixed thereto. The upper end of arm 41 is pivoted, at 43, to one end of a piston rod 44 slidable through the inner end of a cylinder 45, the other end of rod 44 being secured to a piston (not shown) operating in the cylinder 45. An arm 46 extends from the other end of cylinder 45 and is pivoted at 47 to the upper end of arm 42. Pressure resistant flexible conduits 49 and 50 are connected to the cylinder 45 adjacent the ends thereof, suitable known means being provided for admitting operating fluid under appropriate pressure to the cylinder 45 through either of the conduits 49 or 50, selectively, while exhausting fluid from the cylinder through the other conduit. The cylinder 45 and associated parts thus provide an adjustable linkage connection between arms 41 and 42 whereby the jaws 35 and 36 of clamp 34 may be rocked about the stub shaft 33 in opening and closing directions and may be forced toward each other so as to exert considerable pressure on an article about which the clamp is engaged, as will appear more fully presently. Further, by suitable adjustment of the mounting plate 20 the clamp 34 can readily be adjusted vertically to appropriate extent, and by adjustment of the carriage 14 the clamp 34 can be adjusted forwardly and rearwardly toward and away from the table 12. In the retracted or rearward position of the carriage 14, the clamp 34 overhangs the tank or pot 10 at the side thereof adjacent table 12, as shown in Figure 3.

An article supporting arm 52 is secured to an upright 53 at the opposite side of pot 10 from table 12, and extends from upright 53 inwardly over pot 10 to about the mid-portion thereof. Arm 52 is provided, at its inner end, with an upwardly opening notch 54 of rectangular shape for reception of a ring 55 of rectangular cross section. It is assumed, for purposes of description, that the article to be welded is a metal ring having ends which are to be joined together, but it is to be understood that the article may be of any other suitable character and that the arm 52 may be replaced by any suitable means for supporting the article, or articles, to be welded together. The arm 52 is at such a height that the lower open portion of ring 55 is immersed to a substantial depth in the molten salt bath 11, when ring 55 is supported on arm 52 as shown. The clamp 34 remains open and in its raised position shown in Figures 2 and 3, after the ring 55 is placed on arm 52 and until the end portions of ring 55 have been heated to welding temperature and cleaned preliminary to welding, as will be explained presently.

A pump 56 is suitably mounted in the lower portion of pot 10. This pump 56 comprises a cylinder or barrel 57 open at its upper end and provided, a short distance from its upper end, with an inlet port 58. A discharge neck 59 extends from the lower end of pump barrel 57 and opens into the lower end of an upwardly extending nozzle 60 disposed to discharge a jet of the molten salt over and between the adjacent ends of the open ring 55 supported by the arm 52. A pump piston 61, operating in the barrel 57, is secured to the lower end of a rod 62 the upper end of which is secured by coupling 63 to a piston rod 64 slidable through the lower head of a vertically disposed piston 65 mounted on an upright 66 disposed adjacent one end of the pot 10. Suitable pipes or conduits 68 and 69 are connected to the cylinder 65 at the upper and the lower ends, respectively, thereof. Suitable known means is provided whereby an operating fluid under appropriate pressure may be admitted to the cylinder 65 through either of the conduits 68 or 69, selectively, and fluid may be exhausted from cylinder 65 through the other conduit. The upper end of piston rod 64 is secured to a piston (not shown) operating in the cylinder 65, the latter, in conjunction with the conduits 68 and 69 and the piston, providing means whereby the pump piston 61 may be operated.

The article to be welded, such as the ring 55, is placed upon the arm 52 and is supported thereby with its lower portion immersed in the hot molten salt bath 11. The pump piston 61 is then raised into position above the port 58, if not already in that position and, when the end portions of the ring 55 have been heated by the bath 11 to welding temperature, the pump piston 61 is forced downward. In the downward movement of the pump piston 61, a high pressure high velocity jet of the molten salt is discharged from nozzle 60 about and between the end portions of the ring 55, as shown in Figures 2 and 3. This molten salt jet exerts an abrasive action on the opposed end surfaces of the ring 55 effective for quickly removing therefrom any foreign substances and providing clean metal surfaces for welding. Immediately thereafter, and while the lower portion of the ring 55 remains immersed in the bath 11 so as to be maintained thereby at welding temperature, the clamp 34 is lowered into position in alignment with the ring 55 and is then moved forwardly so as to fit thereabout, the jaws 35 and 36 of clamp 34 being moved toward each other or in closing direction during the lowering of the clamp. After the clamp has been thus positioned about ring 55, the continued closing of the clamp compresses the ring and forces the cleaned ends thereof together under welding pressure, and at welding temperature, thus upsetting slightly the ends of the ring and effectively pressure welding them together as shown in Figure 5. The clamp 34, and with it the ring 55 may then be raised out of the molten salt bath 11, after which the clamp may be opened and the ring removed therefrom. The upset metal at the joined ends of the ring may be removed by grinding or treated in any other suitable manner, as is known.

As above noted, I have illustrated the method of my invention as used for welding together the ends of an open ring, by way of example only. The method of my invention may be used for welding together separate articles or portions or parts of the same article, as will be understood. It will also be understood that the method of my invention may be performed by any suitable apparatus and that the apparatus used may be varied within wide limits to suit the work or articles to be welded. Further, the surfaces of the parts to be joined by welding may be cleaned either by a jet of the molten salt bath as illustrated and described, or by any suitable means. Also, if desired, the surfaces to be joined by welding may be cleaned in any suitable known manner prior to immersion and heating of the parts in the bath, when atmospheric conditions and the metal used are such that oxides or other objectionable substances will not form in objectionable amount upon the cleaned surfaces, before the parts are immersed in the bath.

Changes in detail may be resorted to without departing from the field and scope of my invention, and I intend to include all such variations, as fall within the scope of the appended claims, in this application in which the preferred form only of my invention has been disclosed.

I claim:

1. The method of joining metal parts by pressure welding, which comprises disposing the parts with the surfaces thereof to be joined in juxtaposed relation, immersing the parts in a hot inert liquid bath and thereby heating them by conduction to welding temperature, subjecting said surfaces while said parts remain immersed in the bath to a high velocity stream of the bath liquid and thereby abrading and cleaning them and providing clean metal surfaces for welding while shielding said surfaces from air and other gases, and forcing said cleaned surfaces together at welding temperature and under welding pressure while said parts remain immersed in said bath.

2. The method of joining metal parts by pressure welding, which comprises disposing the parts with the surfaces thereof to be joined in juxtaposed relation, immersing the parts in a molten inert salt bath and thereby heating them by conduction to welding temperature, projecting a jet of the molten bath within the latter and while the articles remain immersed in the bath over said surfaces thereby abrading and cleaning the latter and providing clean metal surfaces for welding while shielding said surfaces from air and other gases, and forcing said cleaned surfaces toward each other and together at welding temperature and under welding pressure while the parts remain immersed in said bath.

3. The method of joining metal parts by pressure welding, which comprises disposing the parts with the surfaces thereof to be joined in juxtaposed relation, immersing the parts in a molten inert salt bath and thereby heating them by conduction to welding temperature, withdrawing a charge of the molten inert salt from the body of the bath and projecting the withdrawn molten inert salt in a jet over said surfaces and within said bath while the articles remain immersed therein thereby abrading and cleaning said surfaces and providing clean metal surfaces for welding while shielding said cleaned surfaces from air and other gases, and forcing said cleaned surfaces together at welding temperature and under welding pressure while the parts remain immersed in said bath.

References Cited in the file of this patent

UNITED STATES PATENTS

| | | |
|---|---|---|
| 731,100 | Dick | June 16, 1903 |
| 1,454,214 | Dean | May 11, 1921 |
| 1,966,453 | Lyon | July 17, 1934 |
| 2,040,240 | Coberly et al. | May 12, 1936 |
| 2,053,216 | Deming | Sept. 1, 1936 |
| 2,059,468 | Lyon | Nov. 3, 1936 |
| 2,495,150 | Van Deventer | Apr. 2, 1945 |

FOREIGN PATENTS

| | | |
|---|---|---|
| 607,881 | Great Britain | Sept. 7, 1948 |

OTHER REFERENCES

Materials and Methods, vol. 33, issue 1, pgs. 64–66, pub. date Jan. 1951.

Materials and Methods, vol. 34, issue 4, pgs. 115–130, pub. date Oct. 1951.